July 5, 1932.  G. ARUGA  1,865,666

ROTARY ENGINE

Filed Nov. 30, 1929  4 Sheets-Sheet 1

Inventor
Giuseppe Aruga

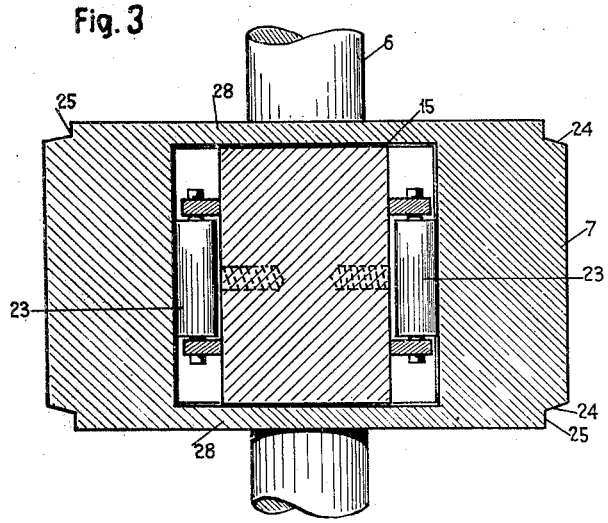
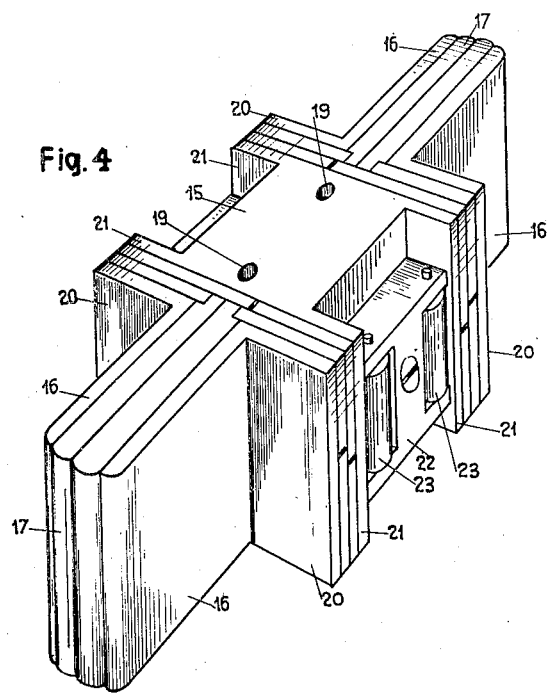

July 5, 1932.  G. ARUGA  1,865,666
ROTARY ENGINE
Filed Nov. 30, 1929  4 Sheets-Sheet 4
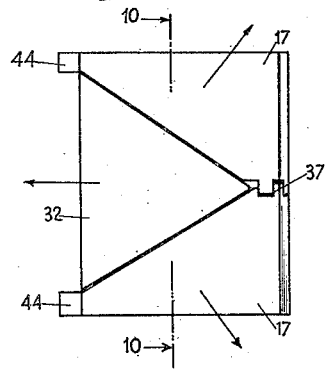
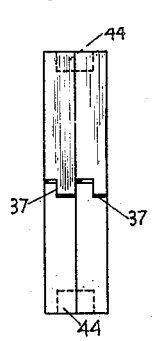
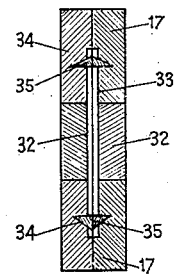
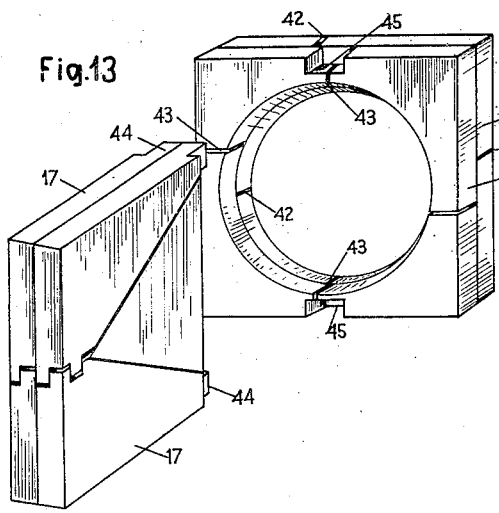
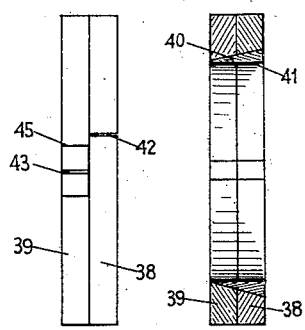
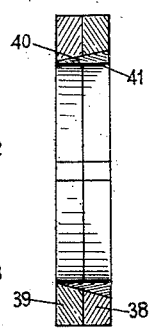
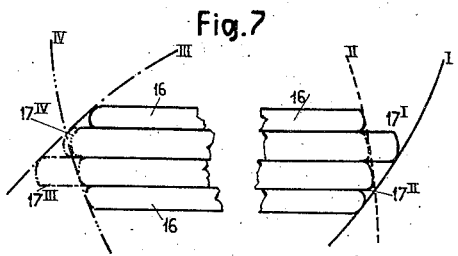
Inventor
Giuseppe Aruga
By
Attorney Patented July 5, 1932

1,865,666

UNITED STATES PATENT OFFICE

GIUSEPPE ARUGA, OF TURIN, ITALY

ROTARY ENGINE

Application filed November 30, 1929, Serial No. 410,837, and in Italy December 1, 1928.

It has already been proposed to use as a motor a device comprising a member—the rotor—adapted to revolve eccentrically of and within a hollow body—the stator—under the action of a fluid which causes the former to rotate, by acting upon radially slidable vanes carried by the rotor, and expanding within the cavity defined by the projecting portion of said vanes, the circular walls and the bottoms or heads of the stator, and the outer wall of the rotor.

It is known, that a moon-shaped curved space results, formed between the periphery of the rotor and the inner surface of the stator, which is divided in two portions by the projecting portion of the vanes, said portions tending to displace and causing the rotor to rotate.

Starting from the same idea, compressors, rotary feeders, pumps and the like have been conceived.

The main difficulty encountered in such constructions consisted in providing the required tightness between the outer edges of the vanes or projecting portions of the pistons and the surfaces which together with a face of said vanes define the expansion chamber. In the known constructions moreover a considerable dissymmetry was noticeable in the stresses applied to the axis of the rotor, and a wear in the inoperative face of the vanes, due to the push on the latter by the fluid and to the rubbing of said face against the corresponding wall of the recess wherein the piston vane slides, internally of the rotor.

According to the present invention the engine consists of a pair of stators and rotors coupled together; each rotor is provided with an end open diametral slot or chamber within which may slide a piston having a substantially constant length, equal to the average diameter of the stator. The piston consists of a rigid portion or body having end recesses in which expansible segments are arranged, to provide for the tightness against the inner periphery of the stator and the bottoms or heads of the casing, and cross recesses in which expansible segments are arranged, providing for the tightness against the walls of the diametral chamber or slot in the rotor and preventing the fluid from passing through from one end of said slot to the other.

The rotors are arranged eccentrically in relation to the cavities in the respective stators, as in the known constructions; they are however so connected to each other (say by means of an outer gearing) as to have a simultaneous operation and to rotate in opposite directions. The inlet and exhaust passages for the operating fluid are placed substantially in the middle of the engine and are bifurcated in such a way as to simultaneously convey the actuating fluid in the moon-shaped cavities of the double stator, so that it will act at one time over the pistons of both rotors. Owing to the eccentricity of the rotors and the constant length of the pistons, the inner periphery of the stators is made with a special outline, as will be seen hereinafter.

In addition to the features referred to and others which will be set forth in detail hereinafter, the invention provides a simple and advantageous general construction, adapted to be easily set up and taken apart both for periodical cleanings and for repairs and changes of worn-out or damaged parts. In addition it is clear that the different tightening members and particularly the special arrangement of a piston, consisting of a rigid portion or body provided with end and cross expansible segments, may also be applied to similar motors, having a single stator and rotor, although these motors are less efficient in operation than the one shown. Similarly engines can also be built, having more than two rotors connected to each other and operating within corresponding chambers in the stator.

In the annexed drawings, forming part of this specification, an embodiment of my invention is shown by way of example, many modifications of construction and details being possible without departing from the scope thereof.

Figure 3 is a cross section of one of the rotors, also showing in cross section its respective piston.

Figure 4 is a perspective view of a complete piston, the tightening means being in their respective operative positions.

Figure 7 is a diagram of operation of the pistons in relation with the peripheral wall of the stator.

Figures 8, 9 and 10 are the side and front views of a set of end segments and their cross section according to the line 10—10 of Figure 8.

Figures 11 and 12 are a top view and a cross section of a set of tightening cross segments.

Figure 13 shows in perspective view the reciprocal position of the cross and end segments at one end of one of the pistons.

Figure 1:
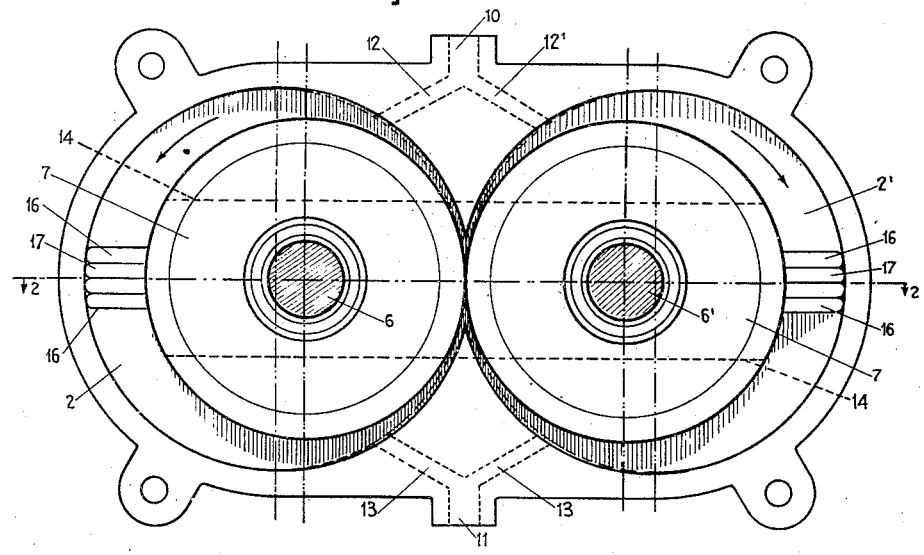
Figure 1 is a plan view of the motor, one cover being taken away.

The engine according to the invention comprises a box 1 in which two substantially cylindrical chambers 2, 2' are provided, tangent to each other in the middle plane of the stator-box. In order to compensate for any wear at the periphery of the rotors, externally of the stator box there may be provided suitable devices, per se known, adapted to keep constant the distance between the shafts of the rotors. In the bottom of the stator-box openings 3, 3' are provided in suitable positions, while the top of the box is closed by a cover 4 having corresponding openings 5, 5', and through said openings pass the shafts 6, 6', integral with the rotors 7, 7' supported in ball bearings 8, 8' and carrying toothed wheels 9, 9' keyed thereon and meshing with each other.

In the side walls of the stator-box there are provided, in opposite positions, the inlets 10 and outlets 11, which internally are bifurcated to the passages 12, 12' and 13, 13', symmetrical with each other and opening into the expansion chambers of the operating fluid. Instead of in the sides of the stator-box, as shown, either the inlets or the outlets, or both, may be provided in the bottom and/or cover of said box, provided they always open symmetrically within the stator.

Figure 5:
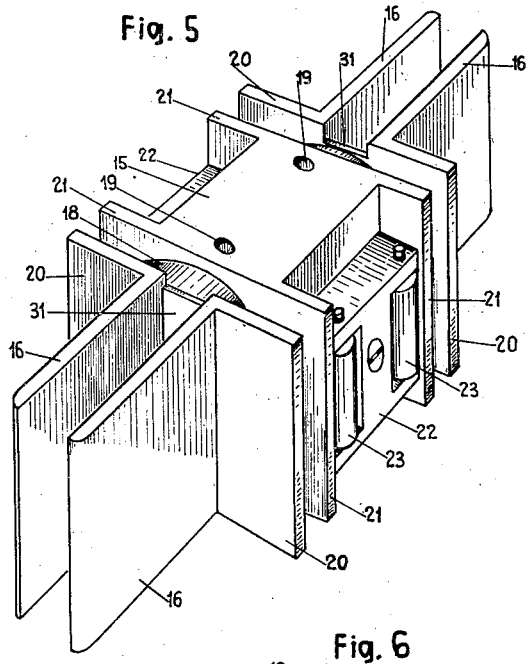
Figure 5 is a similar perspective view without the segments.

As particularly shown in Figures 1 and 3, each rotor 7 consists of a substantially cylindrical body in which a slot 14 is bored, having its walls parallel to one diameter, within which a piston may longitudinally slide, said piston consisting of a body 15 having a number of extensions and guide baffles, as will be seen hereinafter and as particularly shown in Figures 4 and 5 of the drawings. As the total length of the piston, namely of its core body 15 and end extensions 16, is invariable, and as on the other hand each rotor is eccentrically located—as said and according to other known constructions—with respect to its respective chamber in the stator, the contour of said latter chamber is so traced (Fig. 1) as to allow of the eccentric revolution of the sliding pistons, while providing for a substantially permanent cooperation of the end edges (preferably chamfered or rounded) of the extensions 16 with the periphery of the chambers 2 and 2'.

Figure 6:
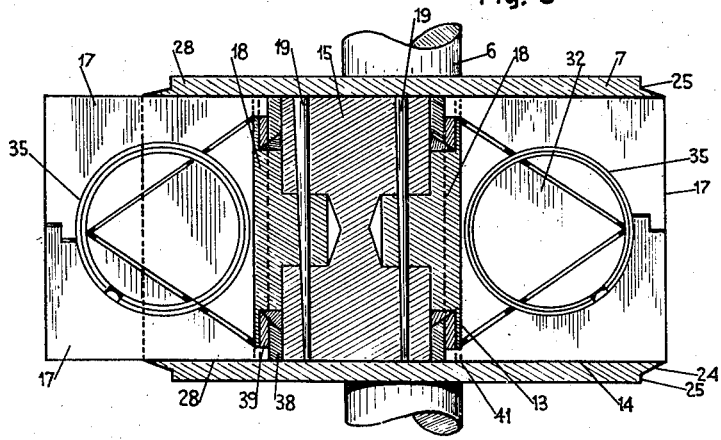
Figure 6 is a longitudinal section of a piston in position within the rotor.

Such cooperation however, constructionally, cannot be more than approximate, and the tightening action proper against the periphery of the stator will be provided by the outer faces of the expansible segments 17 (see particularly Figures 6 and 8), located between the parallel end extensions 16.

The matter described in the following in connection with one piston and one rotor applies identically, of course, also to the other.

Without in any sense being intended as a limitation, it is here noted that the most satisfactory results appear to be obtained by making the rotor of such a size that its diameter shall correspond to about ¾ of that of the stator chamber, the eccentricity being made about ¼ of the radius of the latter.

In Figure 7 there is diagrammatically shown, by way of example, how the outer edges of the extensions 16 and segments 17 operate, as regards cooperation with the periphery of the stator. The latter is shown, for the sake of clarity, in four hypothetical different relative positions I, II, III and IV, by arcs of circles of equal radius, differently dotted, and by similar dots the corresponding positions of the movable segments $17^I$, $17^{II}$, $17^{III}$, and $17^{IV}$ are shown.

It will be noted that for the sake of illustration the inclinations of the pistons to the walls of the stator are exaggerated, namely while the positions II and IV show—by a given normal eccentricity of the rotor in respect of the stator—inclinations close to the real ones, the positions I and III show on the contrary extreme inclinations which will practically never be reached. The arcs I, II, III and IV are traced, as shown, tangent to one of the rigid extensions 16. Owing to the eccentricity and the material thickness of the operative portion of the piston, the rigid extension opposite to the one cooperating with the wall of the stator will necessarily be spaced a distance therefrom, and the tightening contact will be provided for by the outward projection of the expansible segments 17, which will take the positions shown.

The extensions 16, parallel and facing each other in pairs, are integral with a short cylindrical hub 18 having a stud or pivot extending axially therefrom, which is suitably fixed to the central core 15 of the piston either by threading or by a cross pin 19 forcedly inserted from the exterior. The extensions 16 are also integral with cross wings 20 outwardly bent at right angles lying in a plane and of such a width as to correspond to the area of the slot 14 provided in the rotor.

At the ends of the central body 15 of the piston there are provided cross wings 21, also outwardly bent at right angles, so that between the wings 20 and the wings 21, facing and parallel to each other, there will be a space equal to the length or thickness of hub 18.

At each side of the central body 15 of the piston an H-shaped piece 22 is fixed, between the corresponding wings 21, carrying rollers 23 between its prongs, said rollers being preferably mounted on ball-bearings or the like and being adapted to roll against the side walls of the diametral slot in the rotor. While in the embodiment shown, and for the sake of facilitating manufacture, the anti-friction elements 23 are mounted separately on the part 22, and are roller-shaped, they can be formed in other ways and can be applied to the piston in some other manner, while still obtaining the same result of minimizing and substantially avoiding any friction against the side walls of the piston, parallel to the axis of the rotor, that is the friction due to the active and passive tangential stresses from the motor fluid.

We will now describe how, according to the invention, the expansible members or segments designed to provide for the tightness peripherally of the expansion and exhaust chambers, are constructed.

These may be divided into three groups:

I tightening means between rotor body and stator-box;

II tightening means between piston and stator;

III tightening means between piston and rotor.

The first group should substantially compensate for the wear generated, due to the rapid rotation of the rotor, in the inner surfaces of the heads of the stator, and for the play—while very small—that must be left by construction in assembling the parts, for the purpose of minimizing the friction therebetween.

Figure 2:
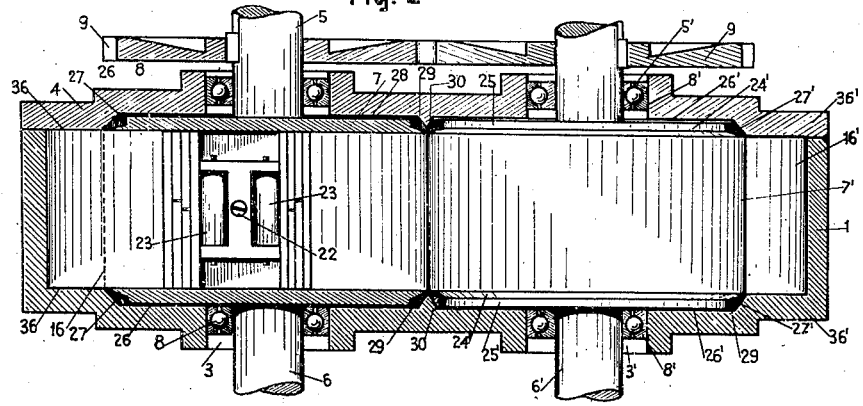
Figure 2 is a longitudinal axial section, taken on line 2—2 of Figure 1, the pistons being in side view.

As particularly shown in Figures 2 and 3, the body of each rotor, 7, 7' is formed at each end with a conical circumferential seat 24, 24', merging in an end cylindrical extension 25, 25'. Concentrically with the axis of each rotor, in the bottom and cover of the stator are milled substantially flat bottomed recesses 26, 26', surrounded by a conical circumferential surface 27, 27'. The end face 28, 28' of each rotor does not normally cooperate with the corresponding plane milled surface 26, 26', there being elastic rings (segments) 29, 30, interposed, which are interlocked with each other and provide for a correct contact with the conical circumferential seats 24, 24', and 27, 27', providing absolute tightness between the heads of the rotor and those of the stator.

The large diameter of the conical milled seats 27, 27' is exactly the same as the diameter of the rotor body.

The members of the second group consist, as already pointed out, of expansible flat segments 17 which are inserted between the end extensions 16 of each piston. Referring to Figures 8, 9 and 10 which illustrate in detail said end segments, it is seen that they consist of two pairs of peripheral segments, 17, 17, at each end of each piston, having substantially the outline of a rectangular triangle, enclosing between them and the wall 31 (Figures 5 and 6), extending crosswise between the end extensions 16 and forming the bottom end of their recess, a further or inner pair of segments 32, also triangular but substantially isosceles. Each group of end segments thus consists of two sets of segments 17, 17, and 32, said sets facing each other, having plane parallel outer faces designed to cooperate with the inner faces of the end extensions 16, and recessed inner faces, as clearly shown in Figure 10, their middle portion 33 being defined by an annular milled recess 34, substantially tangent to the base of the inner segment 32 and of triangular cross section. Within each of the recesses 34 is fitted an elastic ring or circular segment 35 of corresponding section.

The two rings 35 interposed between the two sets of expansible segments abut by their plane faces against each other and owing to the conicity of their outer faces they tend to keep the two sets apart from each other, and at the same time to force them outwardly, substantially in the directions shown by the arrows in Figure 8, the segments of each set independently of the other.

As the segments 32 bear by their bases against the wall 31, the segments 17 will be acted upon to intimately cooperate both with the cross surfaces (Fig. 6) of the diametral slot 14 in the respective rotor and (Fig. 2) with the moon-shaped peripheral portions 36, 36' of the inner faces of the stator bottoms, while being at the same time acted upon to tightly cooperate with the peripheral wall of the stator.

In order to prevent the two segments 17 of each set from being displaced dissymmetrically, and at the same time to avoid any interruption in a transversal direction between each other, in the middle zone where they meet and extending from the apex of the inner segment 32 there are provided zig-zag interlocked indentations 37—per se known—in such a manner as to avoid any losses or knocks from one side of the pairs of sets of segments to the other, such as are particularly likely to take place when they are in one of the extreme positions diagrammatically shown in Fig. 7.

The tightening members included in the III group are provided along similar lines. They consist of two parallel and cooperating sets of expansible segments 38 and 39 (Figures 6, 11 and 12) arranged transversely between the wings 20, 21 around the hubs 18 which connect the end extensions to each piston. Said segments have an inner opening 40 of conical contour, within which, and between it and the corresponding hub 18, an elastic packing ring or segment 41 of suitable section is arranged.

Owing to its outer conicity, cooperating with the inner conicity of the segments 38 and 39, the tendency of said ring is to force the segments outwardly in a substantially radial direction, maintaining them against the walls of the transverse slot 14 and causing them at the same time to tightly bear against the inner face of the cross wings 20, so that any loss of pressure fluid from the interior of the expansion chamber of each stator through the diametrical slot of the corresponding rotor will be entirely avoided. The connection joints 42, 43 between the single segments of each set 38, 39, are in staggered relation in order to improve tightness and avoid losses through the pistons.

In order to improve the hermeticity or tightness between one side and the other of the rotor, along its diametrical slot, the segments 17 are provided at their inner edges with tails or projections 44, narrower than the thickness of the segments and of a length substantially equal to the thickness of the segments 39. The latter are provided, at the ends of their middle line which is parallel to the axis of the rotor, with a pair of corresponding indentations 45, of a width equal to twice the thickness of the tails 44 and extending throughout the thickness of the adjacent segments 39, said indentations being made partly in one and partly in the other of the latter, symmetrically of the middle line referred to above.

The pairs of adjacent tails or projections 44 fit into the corresponding indentations 45, totally filling them. As the joints 42 and 43 are not in the middle plane of the segments 38 and 39, in which is on the contrary—for constructional reasons—the plane of contact of the segments 17 and of the tails 44 thereof, and as the total thickness of the pairs of segments 17 is greater than the width of the indentations 45 where their tails fit, a multiplicity of staggered joints will be provided, through which any loss is negligible.

The operation is as follows:

The motor fluid is conveyed through valves not shown in the inlet 10 and branch passages 12 and 12', into the expansion chambers defined by the peripheral wall of the stators, the outer wall of the rotors and the projecting portions of the sliding pistons therein. Because of its expansion the motor fluid presses against the projecting end portions of the pistons in the direction of the arrows, thus imparting a rotation to both rotors—which are also operatively connected with each other—until it discharges out through the passages 13, 13' and 11, which are properly opened, while a further amount of motor fluid is fed from the opposite side. It will be noted that the double engine described, in addition to being wholly balanced with respect to its middle plane, is also reversible, it being possible to connect the passages 10 and 11, at will, either with the supply or with the exhaust.

The distribution may be so controlled that the outlet valves will open when the corresponding part of the piston has reached and is passing over the outlets, while the engine according to the invention lends itself with considerable practical advantage to have the outlet valves constantly open, so that there will be no counter-pressure detrimental to its power. The supply may accordingly be controlled by known practical means.

The gears 9 may also be so keyed that the strokes of both rotors will be alternative, namely so that practically instead of the pistons being symmetrically arranged, they will be arranged in planes at right angles to each other, the supply and discharge being controlled accordingly.

Finally it must be mentioned that it is possible to apply the tightening means described, as well as the general structure of the rotors and pistons therein, to single rotor engines having a single stator chamber. Similarly, more rotors may be coupled together, by a direct or series connection, within a corresponding number of stator chambers.

Many constructional changes may, of course, be introduced in the embodiment described and illustrated by way of example, without departing from the scope of the invention.

I claim:

1. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, and expansible end elements inserted within each housing, said elements consisting of two sets of substantially plane and triangular segments, each set consisting of two substantially right-angle outer pieces and an isosceles inner piece fitting between the same, the triangular segments of each set having their inner faces provided with a circularly milled recess of triangular cross section, elastic packing rings of a corresponding section being inserted in the recesses of both sets of juxtaposed segments, and tending to expand the segments of each set in a substantially radial direction.

2. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, and expansible end elements inserted within each housing, said elements consisting of two sets of substantially plane and triangular segments, each set consisting of two substantially right-angle outer pieces and an isosceles inner piece fitting between the same, the triangular segments of each set having their inner faces provided with a circularly milled recess of triangular cross section, elastic packing rings of a corresponding section being inserted in the recesses of both sets of juxtaposed segments, and tending to expand said segments in a substantially radial direction, said rings being of such a size with respect to the milled recesses that they tend to force the two sets of segments apart from each other.

3. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, and an elastic ring inserted between said expansible segments and the corresponding hub-like member, tending to force said segments outwardly in a radial direction with respect to said hub-like member.

4. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, and an elastic ring inserted between said expansible segments and the corresponding hub-like member, tending to force said segments outwardly in a radial direction with respect to said hub-like member, said two sets of expansible segments being formed with a common conical inner surface or seat, the elastic ring being of triangular cross section and having a corresponding inclination, so as to also act on the segments in an axial direction, thus causing them to cooperate with the inner side of the outermost fixed cross projection, in insuring the tightness of said piston against the walls defining the expansion chamber.

5. In a rotary engine comprising a stator chamber and a rotor rotatably mounted therein, a rotor piston slidably mounted within and diametrally of said rotor, said piston consisting of a rigid structure provided with end wings or extensions and with cross wings or projections, arranged in pairs so as to be spaced from and facing each other, and means adapted to provide for the tightness against the walls defining the expansion chamber, comprising sets of expansible plane segments coupled in pairs inserted between each pair of wings, and elastic rings tending to maintain said elements in their tightening position, the elements of each set and of cooperating sets being staggered for the purpose of avoiding losses.

6. In a rotary engine comprising a stator chamber and a rotor rotatably mounted therein, a rotor piston slidably mounted within and diametrally of said rotor, said piston consisting of a rigid structure provided with end wings or extensions and with cross wings or projections, arranged in pairs so as to be spaced from and facing each other, and means adapted to provide for the tightness against the walls defining the expansion chamber, comprising sets of expansible plane segments coupled in pairs inserted between each pair of wings, and elastic rings tending to maintain said elements in their tightening position, the elements of each set and of cooperating sets being staggered for the purpose of avoiding losses, the end expansible elements partially interlocking with the cross expansible elements.

7. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, and elastic rings cooperating with the segments of each set tending to force the same outwardly to provide for the tightness against the wall defining the expansion chamber.

8. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, and elastic rings cooperating with the segments of each set tending to force the same outwardly to provide for the tightness against the walls defining the expansion chamber, the elastic rings cooperating with the sets of end segments also tending to force said sets apart from each other, and the elastic rings cooperating with the sets of cross segments also tending to force them in an axial direction with respect to said hub-like members, thus causing them to cooperate with the inner side of the outermost fixed cross projections, in insuring the tightness of said piston against the walls defining the expansion chamber.

9. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, and elastic rings cooperating with the segments of each set tending to force the same outwardly to provide for the tightness against the walls defining the expansion chamber, the end expansible segments partially interlocking with the cross expansible segments.

10. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, and elastic rings cooperating with the segments of each set tending to force the same outwardly to provide for the tightness against the walls defining the expansion chamber, the elastic rings cooperating with the sets of end segments also tending to force said sets apart from each other, and the elastic rings cooperating with the sets of cross segments also tending to force them in an axial direction with respect to said hub-like members, thus causing them to cooperate with the inner side of the outermost fixed cross projections, in insuring the tightness of said piston against the walls defining the expansion chamber, the end expansible segments partially interlocking with the cross expansible segments.

11. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, and expansible end elements inserted within each housing, said elements consisting of two sets of substantially plane and triangular segments, each set consisting of two substantially right-angle outer pieces and an isosceles inner piece fitting between the former ones, each hub-like member having opposite cross wings or projections extending at right angles to the axis thereof, said central body having corresponding cross wings or projections parallel to and spaced from the former, forming housings each having open sides and open end, two sets of expansible segments inserted within each housing, elastic rings cooperating with the segments of the end sets tending to force the adjacent sets apart from each other, and elastic rings inserted between said cross expansible segments and the corresponding hub-like member, tending to force said segments outwardly in a radial direction with respect to said hub-like member, said two sets of cross expansible segments being formed with a common conical inner surface or seat, the elastic ring being of triangular cross section and having a corresponding inclination, so as to also act on the segments in an axial direction, thus causing them to cooperate with the inner side of the outermost fixed cross projection, in insuring the tightness of said piston against the walls defining the expansion chamber.

12. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, and elastic rings cooperating with the segments of each set tending to force the same outwardly to provide for the tightness against the walls defining the expansion chamber, the expansible cross segments of the outermost sets being provided with indents, and the expansible segments of the end sets being provided with projections registering and interlocking therewith, so as to be in a staggered relation in their intersection with respect to the junction planes of the adjacent segments.

13. In a rotary engine comprising a stator chamber and a rotor rotatably mounted therein, a rotor piston slidably mounted within and diametrally of said rotor, said piston consisting of a rigid structure comprising a central body and two hub-like members fixed thereon and axially extending therefrom in opposite directions, each hub-like member having a pair of transversely spaced wings or extensions extending longitudinally of said body, forming a housing having open sides and an open end, and expansible end elements inserted within each housing, said elements consisting of two sets of substantially plane and triangular segments, each set consisting of two substantially right-angle outer pieces and an isosceles inner piece fitting between the same, each hub-like member having opposite cross wings or projections extending at right angles to the axis thereof, said central body having corresponding cross wings or projections parallel to and spaced from the former, forming housings each having open sides and an open end, two sets of expansible segments inserted within each housing, elastic rings cooperating with the segments of the end sets tending to force the adjacent sets apart from eac hother, and elastic rings inserted between said cross expansible segments and the corresponding hub-like member, tending to force said segments outwardly in a radial direction with respect to said hub-like member, said two sets of cross expansible segments being formed with a common conical inner surface or seat, the elastic ring being of triangular cross section and having a corresponding inclination, so as to also act on the segments in an axial direction, thus causing them to cooperate with the inner side of the outermost fixed cross projection, in insuring the tightness of said piston against the walls defining the expansion chamber, the expansible cross segments of the outermost sets being provided with indents, and the expansible segments of the end sets being provided with projections registering and interlocking therewith, so as to be in a staggered relation in their intersection with respect to the junction planes of the adjacent segments.

In testimony whereof, I affix my name to this specification.

GIUSEPPE ARUGA.